June 16, 1942.   H. A. HUTCHINS   2,286,547
POWER TAKE-OFF ATTACHMENT
Filed Feb. 21, 1939   2 Sheets-Sheet 1
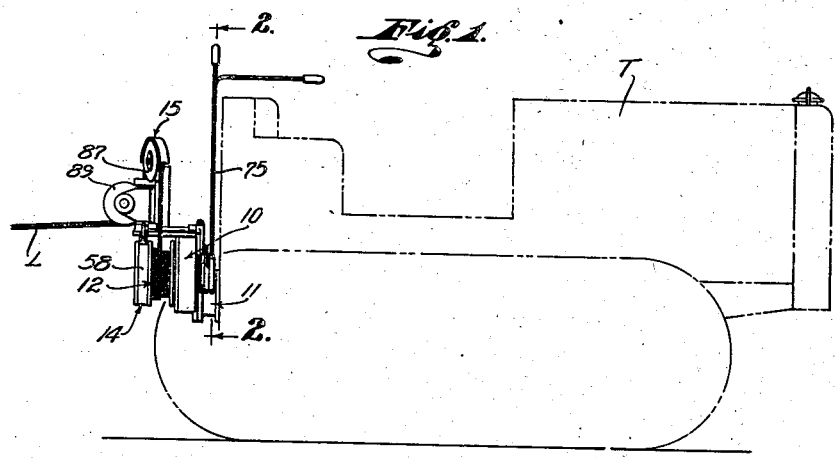
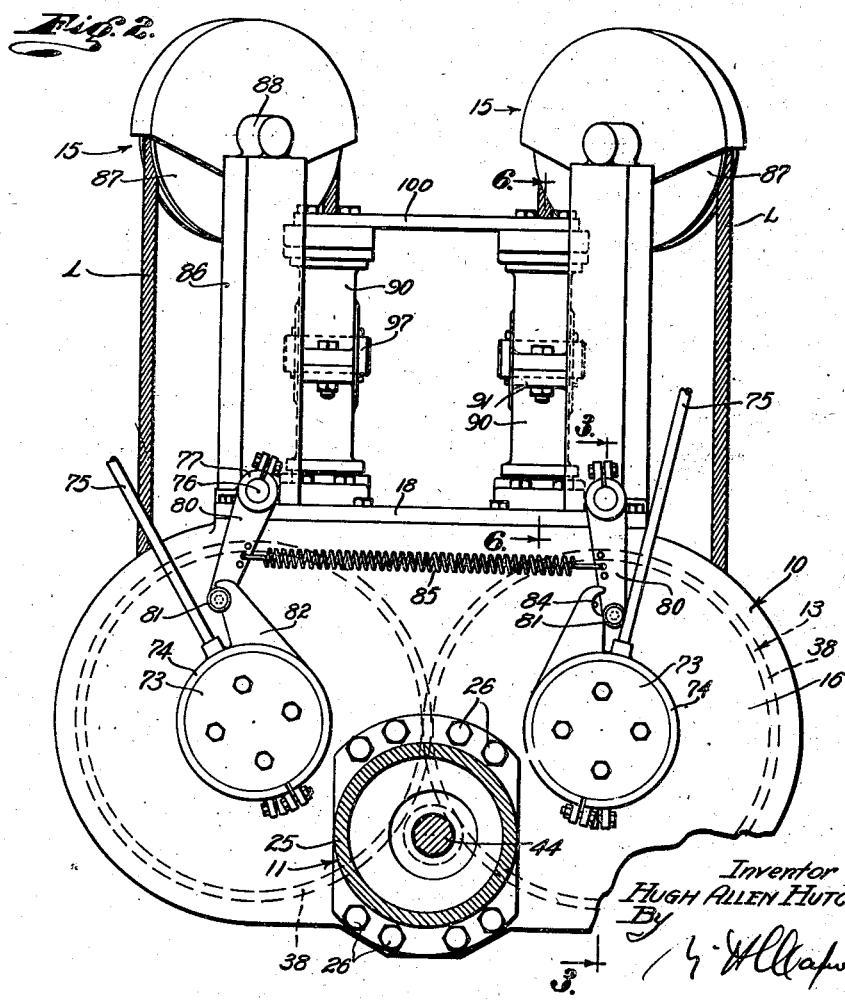
Inventor
HUGH ALLEN HUTCHINS
By
His Attorney June 16, 1942.    H. A. HUTCHINS    2,286,547
POWER TAKE-OFF ATTACHMENT
Filed Feb. 21, 1939    2 Sheets-Sheet 2
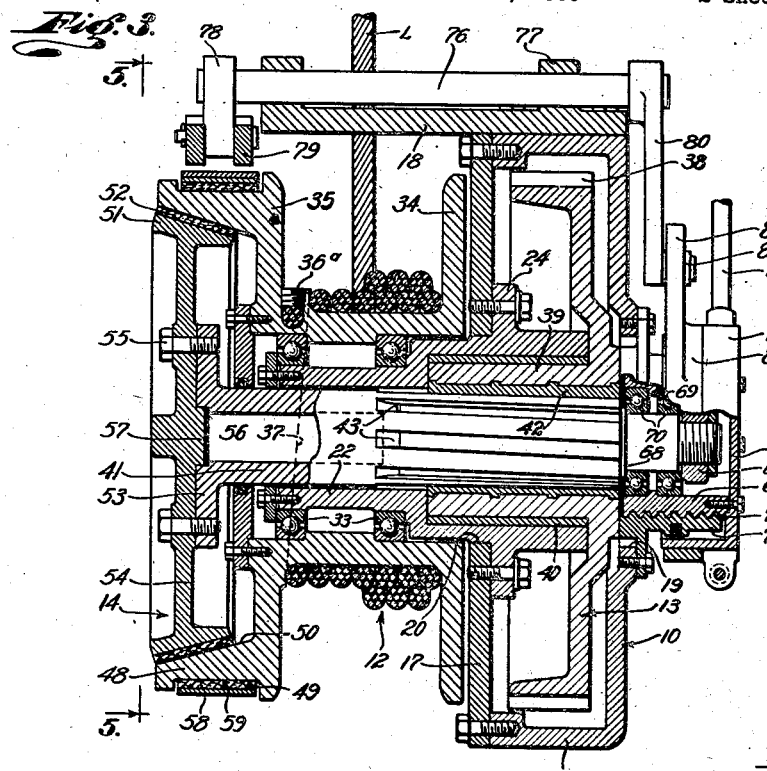
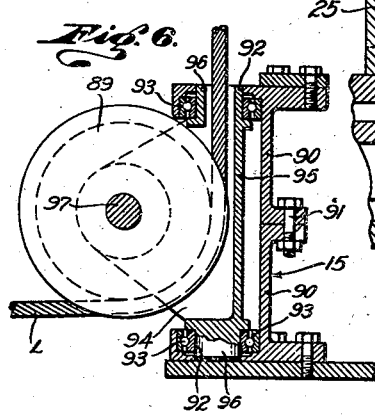
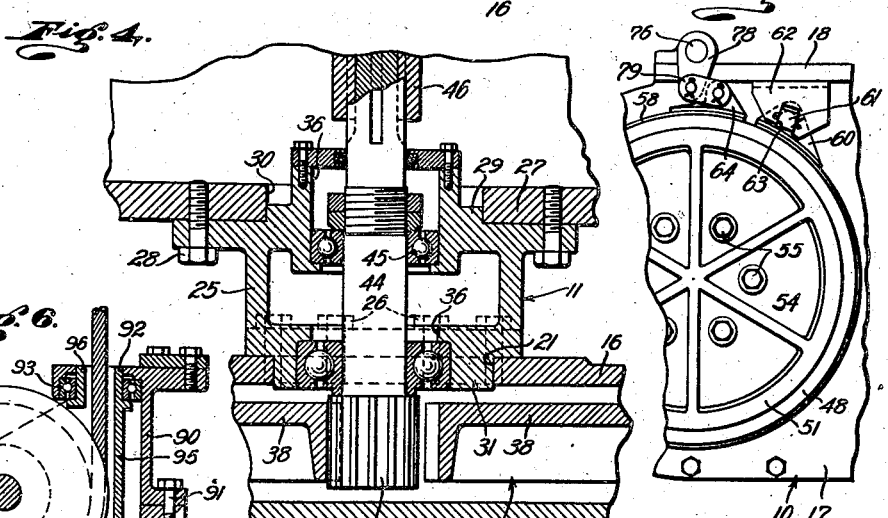
Inventor
HUGH ALLEN HUTCHINS
By
His Attorney Patented June 16, 1942

2,286,547

UNITED STATES PATENT OFFICE 2,286,547

POWER TAKE-OFF ATTACHMENT

Hugh Allen Hutchins, Los Angeles, Calif.

Application February 21, 1939, Serial No. 257,671

8 Claims. (Cl. 254—187)

This invention relates to attachments for tractors and other power driven vehicles, and relates more particularly to a power take-off attachment to be applied to a tractor, or the like, to control and operate various devices and implements drawn by or associated with the tractor or vehicle. A general object of this invention is to provide a practical, effective power take-off attachment that is convenient to control and operate and that is easy to service and recondition.

Another object of this invention is to provide a power take-off attachment for tractors and the like that is adapted for connection with a tractor drive shaft driven in a clockwise direction or with a tractor drive shaft driven in a counter-clockwise direction. Some makes and types of tractors have drive shafts driven in a clockwise direction while other tractors have shafts driven in a counter-clockwise direction. The device of the present invention is suitable for use on both types of tractors without modification or alteration.

Another object of this invention is to provide a power take-off attachment embodying novel means for controlling the clutches of the drums which means require a minimum of manual exertion and a short manual stroke for their operation.

Another object of this invention is to provide a power take-off attachment of the character mentioned, in which the clutch means are partially self-energized, that is, the applied power from the drive shaft assists in engaging the clutches.

Another object of this invention is to provide a power-take-off attachment embodying novel simplified bearing means for the drum driving shafts and for the principal gears.

Another object of this invention is to provide a power take-off attachment of the character referred to in which the clutches and brakes are arranged to be immediately accessible and easily removable for relining, reconditioning and replacement. The clutches and the associated brakes of the mechanism provided by this invention are located at the rear of the horizontally disposed line drums to be freely accessible for removal and repair without disturbing the drums, the controls, or the other parts of the mechanism.

A further object of this invention is to provide a power take-off attachment of the character referred to embodying novel means for handling and directing the lines leaving the drums to avoid excessive friction on the lines and give the lines effective fair leads.

The various objects and features of my invention will be fully understood from the following detailed description of a typical, preferred form and application of the invention, throughout which description reference is made to the accompanying drawings, in which:

Fig. 1 is a side elevation of the improved attachment of the present invention in position on a typical tractor showing the tractor in broken lines. Fig. 2 is an enlarged front view of the attachment with the adapter and drive shaft in vertical cross section, being a view taken substantially as indicated by line 2—2 on Fig. 1. Fig. 3 is an enlarged vertical detailed sectional view taken as indicated by line 3—3 on Fig. 2 showing the clutch in a released condition. Fig. 4 is an enlarged fragmentary horizontal detailed sectional view illustrating the adjustable mounting of the attachment and the adjacent parts. Fig. 5 is a reduced fragmentary rear elevation taken substantially as indicated by line 5—5 on Fig. 3, and Fig. 6 is a vertical detailed sectional view of a portion of one of the line handling means, being a view taken substantially as indicated by line 6—6 on Fig. 2.

The power take-off attachment of the present invention is adapted to be applied to tractors and other power driven vehicles of various makes, types, etc. and may be employed to control or operate grading, excavating, and road building machines and implements of different kinds. In the following detailed description I will describe a typical preferred form of the invention applied to a more or less conventional tractor to be useful in operating and controlling excavating and grading machinery carried by or drawn by the tractor. It is to be understood that the invention is not to be construed as limited or restricted to the specific form of the invention herein described.

The power take-off attachment of the present invention may be said to comprise, generally, a housing 10, adjustable means 11 for mounting the housing 10 on the tractor T, a pair of spaced line winding drums 12 rotatably mounted on the housing 10, drive means 13 in the housing 10 for rotating the drums 12, clutch and brake means 14 for controlling the drums 12, and means 15 for handling the lines L extending from the drums 12.

The housing 10 is provided to carry and house the various operating parts of the mechanism. In the preferred construction illustrated the housing 10 includes a body 16 and a plate 17 closing the rear side of the body 16. A generally horizontal mounting plate 18 is suitably secured to the upper side of the housing body 16 to carry the means 15 and other parts. Sets or pairs of aligned horizontal openings 19 and 20 are provided in the forward wall of the body 16 and the housing plate 17, respectively. The openings 19 and 20 of each pair are horizontally aligned and the pairs of openings are equally spaced from the central vertical plane of the housing 10. A horizontal opening 21 is provided in the forward wall of the housing body 16 and has its longitudinal axis on the central vertical plane of the housing. The opening 21 is spaced below the common plane occupied by the longitudinal axes of the openings 19 and 20. The housing 10 is provided with rearwardly projecting extensions 22 for carrying the drums 12 and certain elements of the drive means 13. The extensions 22 are tubular members extending rearwardly through the openings 20 in the plate 17. Flanges 24 on the extensions 22 are suitably fixed to the inner surface of the plate 17. The housing extensions 22 are alike or identical and project a substantial distance rearwardly from the plate 17.

The means 11 for mounting the attachment on the tractor T is adjustable, that is, it adapts the device for use on tractors having shafts driven in either the right-hand direction or the left-hand direction. The adjustable attaching means 11 includes an attaching member or adapter 25. The adapter 25 is a tubular element for passing the drive shaft of the drive means 13, as will be later described. A flange at the rear end of the adapter 11 is detachably secured to the housing body 16 by sets of screws 26. A similar flange on the forward end of the adapter 11 is detachably secured to the mounting plate 27 of the tractor T by screws 28. A boss 29 projects forwardly from the adapter 25 and cooperates with an opening 30 in the mounting plate 27. It is important to note that the boss 29 is concentric to the shaft receiving opening 36 of the adapter 25. A boss 31 projects from the rear end of the adapter 25 and cooperates with the opening 21 in the housing body 16. The boss 31 is eccentric relative to the boss 29 and the opening 36 of the adapter 25. The central longitudinal axis of the boss 31 is offset horizontally from the longitudinal axis of the opening 36. It will be seen that the cooperation of the boss 31 with the opening 21 holds the housing 10 offset horizontally from the longitudinal axis of the tractor shaft and the opening 30. By detaching the adapter 25 from the tractor T and housing 10 and then turning it 180° the direction of this horizontal offset or eccentricity of the housing 10 may be reversed. This adjustment of the adapter 25 reverses the drive means 13 as will be later described.

The drums 12 are provided to operate lines L for the control and operation of machines and implements drawn, controlled, or carried by the tractor T. The drums 12 may be identical in size and construction. In accordance with the invention the drums 12 are tubular members and are arranged horizontally at the rear of the housing 10. The above described housing extensions 22 extend into the tubular drums 12 to support the drums for rotation about spaced horizontal axes. Longitudinally spaced anti-friction bearings 33 rotatably support the drums 12 on the housing extensions 22. The bearings 33 cooperate with internal shoulders in the drums 12 and external shoulders on the extensions 22 to take the end thrusts as well as the radial loads. Inner and outer end flanges 34 and 35 are provided on the drums 12 to define the line receiving spaces. The end portions of the lines L may be secured in openings in the drums 12 by clamp screws 36ª. The drums 12 preferably have helical faces 37 adjacent the bases of the flanges 35 to cooperate with and locate the first turns or convolutions of the lines L to assure the even helical reeling of the lines on the drums. The lines L are wound on the drums 12 to pass upwardly from the outer sides of the drums, as illustrated in Fig. 2.

The drive means 13 is operable to rotate the drums 12 through the medium of the clutch means 14. The drive means 13 includes two like gears 38 in the housing 10. The gears 38 are spaced apart horizontally and each gear is concentric relative to a drum 12 and its related extension 22. In accordance with the invention the gears 38 have internal bearings in the housing extensions 22. The inner portions of the openings of the tubular extensions 22 are enlarged in diameter and the gears 38 have bearing hubs 39 received in these enlarged portions of the openings. Suitable bushings 40 support the hubs 39 in the housing extensions 22 for free rotation. The gear hubs 39 are of substantial length and have extensive bearing engagement in the tubular extensions 22.

Each gear 38 of the means 13 has driving cooperation with a shaft 41. The shafts 41 extend longitudinally through the gears 38 and the related extensions 22 and project from the rear ends of the drums 12. The shafts 41 pass through the outer portions of the housing extensions 22 with suitable clearance and have novel bearing engagement in the gear hubs 39. Longitudinal bearings or bushings 42 of babbitt or the like are provided in the gear hubs 39 to carry the shafts 41. The bushings 42 form the bearings for the shafts 41 and are of substantial length to have extensive supporting cooperation with the shafts.

In accordance with the invention the bushings 42 and the shafts 41 have screw engagement or thread engagement whereby the shafts 41 may be fed axially relative to the gears 38 during certain phases of operation and under certain circumstances. The bushings 42 of the gear hubs 39 and the shafts 41 have cooperating pitched or helical keys or splines 43. The pitch of the splines 43 may be slight relative to the longitudinal axis of the shafts 41, for example, the splines 43 may have a pitch of from one degree to two degrees. The cooperation of the splines 43 is such that they normally transmit rotation from the gears 38 to the shafts 41 without causing axial shifting of the shafts. However, when the torque load on the shafts 41 is increased, as by the engagement of their clutches, the splines 43 operate to shift the shafts forwardly. This action of the splines 43 is utilized to assist in the actuation of the clutch means 14 as will be hereinafter described.

The drive means 13 further includes a pinion shaft 44 extending through the adapter 25 and adapted to be connected with the drive shaft (not shown) of the tractor T. The shaft 44 is rotatably supported by spaced anti-friction bearings 45 in the adapter 25. The bearings 45 cooperate with internal shoulders in the adapter 25 and with shoulders on the shaft 44 to assume the end thrusts as well as the radial thrusts. The forward end of the shaft 44 projects from the adapter 25 for connection with the shaft (not shown) of the tractor T. A suitable coupling 46 may serve to connect the shaft 44 with the shaft (not shown) of the tractor T. The shaft 44 supported as described above is in co-axial relation to the opening 36 and the forward boss 29 and is, therefore, in eccentric relation to the boss 31 and the housing opening 21. The shaft 44 extends rearwardly from the boss 31 and its projecting rear portion carries a pinion 47. In practice the pinion 47 may be integral with the shaft 44. The pinion 47 meshes with one of the gears 38 and the two gears 38 have meshing cooperation. The drive is such that the upper portions of the meshing gears 38 turn away from one another to reel the lines L onto the drums 12. In the particular application of the invention illustrated the drive of the tractor T may be considered that the shaft 44 is rotated in a counter-clockwise direction viewing the shaft from its forward end. In this case the adapter 25 is adjusted or set so that the pinion 47 meshes with the righthand gear, as seen in Fig. 2. In the event that the shaft 44 is to be driven in a clockwise direction the adapter 25 is disconnected and is turned 180° from the position illustrated in the drawings and then re-connected with the housing 10 and the tractor plate 27. Due to the eccentricity of the boss 31 this adjustment or turning of the adapter 25 brings the pinion 47 into meshing engagement with the lefthand gear 38 as viewed in Fig. 2. The pinion 47 when rotating in a clockwise direction and when meshing with the lefthand gear 38 rotates the two gears 38 to have their upper portions turn away from one another. It will be seen that a simple setting or adjustment of the adapter 11 adapts the mechanism for operation by a shaft rotating in a right-hand direction or a lefthand direction as the case may be. The attaching bolts or screws 26 and 28 of the adapter 25 are provided in diametrically opposite sets to facilitate the adjustment of the adapter.

The clutch and brake means 14 is provided to control the operation or rotation of the drums 12. During the operation of the tractor T the shafts 41 may be rotated continuously and the means 14 is operable under the control of the operator to engage one or both of the drums 12 with the shafts 41, to hold one or both of the drums against rotation, or to allow one or both of the drums to rotate freely, as the operating conditions may require. The clutch and brake means 14 embodies clutches located to be immediately accessible for removal, reconditioning and replacement. The means 14 includes rearwardly projecting tubular or annular flanges 48 on the outer flanges 35 of the drums 12. The flanges 48 may be integral with the drum flanges 35. The peripheral or external surfaces of the flanges 48 are provided with cylindrical braking surfaces 49 while the inner sides of the flanges 48 have conical or tapered annular clutch surfaces 50.

The means 14 further includes clutch cones 51 for cooperating with the clutch surfaces 50. The peripheries of the cones 51 have suitable friction material 52 for engaging the conical clutch surfaces 50. The rear ends of the shafts 41 have radial flanges 53 and the cones 51 have webs 54 bearing forwardly against the flanges 53. Screws 55 connect the webs 54 with the flanges 53 to secure the cones 51 to the shafts 41. The screws 55 are arranged to have their heads exposed at the rear sides of the webs 54 to be readily accessible for engagement. It is to be observed that the screws 55 may be engaged and removed without disturbing any other parts of the mechanism. Sockets 56 may enter the shafts 41 from their rear ends and the clutch webs 54 may have pins or hubs 57 entering the sockets 56 to centralize the cones 51. The clutch cones 51 are shiftable with their respective shafts 41 between the engaged positions where they drive the drums 12 and the released positions where they are clear of the clutch surfaces 50.

The brakes of the means 14 comprise flexible bands 58 engaging around the flanges 48 and brake lining 59 on the bands for cooperating with the surfaces 49. Each brake band 58 has a dead end and has a shiftable or active end. Fixtures 60 are secured to the dead end portions of the brake bands 58 and pivotally carry laterally projecting blocks 61. Brackets 62 are secured to the mounting plate 18 and have slots 63 receiving the blocks 61 to anchor the dead end portions of the brake bands 58. In accordance with the invention the slots 63 are tangential relative to circles concentric with the axes of rotation of the shafts 41 and the direction of the pitch of the slots, relative to the line unreeling direction of rotation of the drums 12, is such that the blocks 61 slide down in the slots when the brakes are actuated or set. Thus the engagement of the blocks 61 in the slots 63 provides for a self-energization of the brakes. The free or active ends of the brake bands 58 carry lugs 64 engaged by or connected with parts of the brake control means which will later be described.

The means 14 further includes controls for the clutch and brake mechanisms of the drums 12. In accordance with the invention the shafts 41 are shiftable axially by novel easily operated controls to engage and disengage the clutch cones 51 from the flanges 48. The clutch controlling mechanisms include sleeves or nuts 66 operatively connected with the shafts 41 (see Fig. 3). The shafts 41 have reduced portions projecting forwardly from the housing body 16 and the nuts 66 surround these shaft portions. The nuts 66 are shiftable longitudinally with the shafts 41 but are turnable independently of the shafts. The means for connecting the nuts 66 with the shafts 41 include retaining nuts 67 on the end parts of the shafts 41 and shoulders 68 on the shafts opposing the nuts 67. Annular internal ridges 69 are provided on the inner walls of the nuts 66. Spaced anti-friction bearings 70 rotatably support the nuts 66 on the shafts 41 and cooperate with the ridges 69, the nuts 67 and the shoulders 68 to connect the shafts and the nuts against relative longitudinal movement. The nuts 66 turn or operate in forwardly projecting tubular shells 71 on the housing body 16. The shells 71 may be suitably bolted to the housing body 16 and may enter the openings 19 with clearance. The nuts 66 and their surrounding shells 71 have cooperating or mating threads 72 whereby turning of the nuts causes longitudinal shifting of the shafts 41. The threads 72 are heavy or coarse and have a steep pitch, for example, they may have a three or four inch lead.

Manual lever means are provided for turning the nuts 66 to control the clutches for the drums 12. A cap 73 is secured to the end of each nut 66 and extends rearwardly in surrounding relation to the adjacent shell 71. A split adjustable clamp 74 engages about each cap 73 and is adapted to be set or locked in the selected position on the cap. Handles or levers 75 are fixed to the clamp 74 and extend upwardly to be conveniently accessible to the operator of the tractor T. The levers 75 may be manually shifted or operated to turn the nuts 66 and thus cause longitudinal shifting of the shafts 41 and engaging or disengaging of the clutches of the drums 12. The steep lead or pitch of the threads 72 imparts a maximum axial movement to the shafts 41 for a given manual stroke of the levers 75.

The means for controlling or operating the brakes for the drums 12 include horizontal shafts 76 rotatably carried by suitable bearings 77 on the mounting plate 18. Depending arms 78 are fixed to the rear ends of the shafts 76 and project downwardly to be in adjacent relation to the lugs 64 on the brake bands 58. The arms 78 may directly bear against the lugs 64 to effect the actuation or setting of the brakes when the shafts 76 are turned. In the case illustrated, however, pivoted links 79 connect the arms 78 with the brake band lugs 64. The forward end of each brake shaft 76 is provided with a depending lever 80. A freely rotatable roller 81 is carried on the lower end of each lever 80. Projections 82 carried by the caps 73 cooperate with the rollers 81. In the preferred construction the projections 82 are provided with adjustable clamps 83 engaging about the caps 73 whereby the projections may be set in the correct position for engagement with the rollers 81.

Notches 84 are provided in the edges of the projections 82 to receive the rollers 81. When a roller 81 is received in a notch 84 as illustrated at the lefthand side of Fig. 2, the associated brake band 58 is retained in a disengaged position where it is substantially free from the braking surface 49 and the clutch cone 51 of the associated clutch is in the disengaged position. Accordingly, the engagement of a roller 81 in a notch 84 provides for the free spooling of a drum 12 whereby the line L may freely play out from the drum. To engage a clutch cone 51 with its clutch surface and thus provide for rotation of a drum 12 and reeling in or a line L, a manual lever 75 is shifted to rotate a nut 66 and thus shift a shaft 41 forwardly. This forward movement of the shaft 41 brings the associated clutch cone 51 to the engaged position and effects rotation of the drum 12. In accordance with the invention the associated or related brake means is free or substantially free when a clutch is engaged to drive a drum 12. The brake means for the two drums 12 are actuated by a spring 85 connected between the two levers 80. When the manual lever 75 is shifted to effect the engagement of a clutch cone 51 as described above, the spring 85 swings the associated lever 80 and thus urges the brake shoe 58 to the braking position. However, the pivotal mountings of the brake bands 58 are such that the bands merely drag with but little friction when the drums 12 rotate in the line spooling direction and bind or wrap about the flanges 48 when the drums tend to rotate in the line unspooling direction. When a clutch cone 51 is shifted into the engaged position to drive a drum 12 the actuation of the related brake means by the spring 85 offers little, if any, resistance to rotation of the drum by the power means. When it is desired to maintain the tension on a line L the related manual lever 75 is shifted to a position to disengage the clutch of the drum. Swinging of the manual lever 75 shifts the shaft 41 to move the cone 51 to its disengaged position. This release of the clutch means is accompanied by the automatic energization or setting of the brake means. As described above, the pivotal mountings of the brake bands 58 are such that the bands automatically wrap onto the surfaces 49 to resist unreeling of the lines L when the levers are energized or conditioned by the spring 85.

A line guiding or directing means 15 is provided for each line L and the means 15 serve to direct the lines as they leave the drums 12 to give them suitable fair leads. Each means 15 includes a fixed post 86 projecting upwardly from the plate 18 in approximate vertical alignment with the adjacent drum 12. A pulley or sheave 87 is rotatably supported on the upper end of each post 86. The sheaves 87 are supported for rotation about horizontal axes by suitable shafts 88 fixed to the upper ends of the posts. In accordance with the invention the sheaves 87 are pitched outwardly and forwardly relative to the longitudinal axes of the drums 12 and are located to most effectively receive the lines L passing upwardly from the drums. The lines L pass over the sheaves 87 and then pass downwardly to pivoted or swinging sheaves 89.

The means for supporting the swinging sheaves 89 comprise like assemblies, each including two complementary opposed sections 90 connected by bolts 91. The lower ends of the lower sections 90 are suitably bolted to the plate 18. A brace 100 may connect the upper ends of the two upper sections 90. The upper and lower parts of the connected sections 90 have aligned vertical openings 92 provided with antifriction bearings 93. Spaced vertically disposed wings 94 are connected by a vertical web 95 and the upper and lower ends of the web 95 have bosses 96. The bosses 96 are received in the openings 92 and are turnably supported by the bearings 93. The upper bosses 96 are tubular to receive or pass the lines L. Horizontal pins or shafts 97 on the wings 94 rotatably support the sheaves 89. The lines L pass downwardly from the pitched upper sheaves 87 to extend through the tubular bosses 96 and then engage under the sheaves 89 to pass rearwardly therefrom. The sheaves 89 supported as just described are adapted to swing through arcs of substantially 180° so that the rearwardly extending lines L have a great freedom of movement.

It is believed that the operation of the power take-off attachment will be readily understood from the foregoing detailed description. As described above, the adapter 25 may be set or positioned to provide for the correct operation of the mechanism by a tractor shaft driven either in a righthand direction or a lefthand direction. During operation of the tractor T the shafts 41 may be continuously rotated through the medium of the shaft 44 and the pinion 47 and meshing gears 38. When it is desired to allow a line L to freely play out from a drum 12 the proper manual lever 75 is brought to a position such as shown in the lefthand side of Fig. 2 where the roller 81 is received in the notch 84. Bringing the lever 75 to this position is accompanied by turning of the nut 66 and rearward shifting of the shaft 41 and its clutch cone 51. The clutch cone 51 is thus brought to the disengaged position. The engagement of the roller 81 in the notch 84 locks or holds the associated brake mechanism in a condition where it offers a minimum of resistance to the free unreeling of the line L. When it is desired to reel in a line L the clutch lever 75 is shifted to a generally vertical position to turn the nut 66 in a direction to feed the shaft 41 and its clutch cone 51 forwardly. This engages the drum 12 with its shaft 41. Upon engagement of a clutch means as just described the torque load transmitted from a gear 38 to its shaft 41 is increased and the cooperating splines 43 subjected to this increased torque shift or advance the shaft forwardly. Thus the splines 43 assist in the engaging of the clutch means so that the clutch means are partially self-energizing. When it is desired to condition a drum 12 to maintain a tension on its line L the related lever 75 is brought to a position such as shown at the righthand side of Fig. 2 of the drawings. With the lever 75 in this position the clutch means is disengaged and the brake means is set or free to resist unreeling of the line. The pivots of the brake bands 58 are such that the bands automatically wrap themselves onto the brake drum surfaces 49 to resist unreeling of the lines L. The blocks 61 tend to shift inwardly in the slots 63 when the bands 58 have active braking action.

The attachment is compact and readily applied to tractors and the like of various types and constructions. The drums 12 are readily controlled by the conveniently accessible levers 75 for governing the clutch and brake mechanisms of the drums. The steeply pitched threads 72 impart the necessary longitudinal movement to the shafts 41 for the control of the clutch means with a minimum movement of the levers 75. The splines 43 assist in the actuation of the clutch cones 51 to the engaged positions and make it easy to engage the clutch means. When it becomes necessary to replace the friction material 52 on the clutch cones 51 the screws 55 are unthreaded and removed to disconnect the cones 51 from their shafts 41. The screws 55 are freely accessible at the rear end of the attachment and the clutch cones 51 may be removed without interference from the other parts of the device. The gears 38 and the shafts 41 are supported by a compact, simplified bearing arrangement that is dependable and long wearing.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A power take-off unit for a tractor comprising a housing, means at the front of the housing for securing the same to the tractor, a generally horizontal drum rotatably supported on the rear side of the housing, a drive in the housing including a rotatable drive shaft extending rearwardly through the drum to the rear end of the drum, means supporting the shaft for longitudinal movement relative to the housing and drum, and a clutch at the rear end of the drum for transmitting rotation from the shaft to the drum and controlled by longitudinal movement of the shaft, the clutch including two cooperable parts, one on the drum, the other secured to the shaft for convenient rearward detachment therefrom.

2. A power take-off attachment for a tractor or the like comprising a housing having a rearwardly projecting tubular extension, means at the front of the housing for securing the housing to the tractor, a substantially horizontal drum rotatable on the extension, a drive in the housing including a rotatable drive shaft extending rearwardly through the extension to the rear end of the drum, means in the housing for supporting the shaft for longitudinal movement relative to the housing and drum, clutch means at the rear end of the drum for transmitting rotation from the shaft to the drum and controlled by longitudinal movement of the shaft, the clutch means comprising two parts engaged and disengaged by said longitudinal movement of the shaft, one of said parts being on the drum, the other part being detachably secured to the shaft, and means for moving the shaft longitudinally.

3. A power take-off attachment for a tractor or the like comprising a housing having a rearwardly projecting tubular extension, means at the front of the housing for securing the housing to the tractor, a substantially horizontal drum rotatable on the extension, a drive in the housing including a rotatable drive shaft extending rearwardly through the extension to the rear end of the drum, means for supporting the shaft for longitudinal movement, a clutch part on the rear end of the drum, a clutch part on the shaft cooperable with the part on the drum to transmit rotation to the drum, and means at the forward side of the housing for shifting the shaft longitudinally to effect the engagement and disengagement of the clutch parts.

4. A power take-off unit of the character described comprising a housing, a rotatable drum carried by the housing, a rotatable and longitudinally shiftable drive shaft for driving the drum, clutch parts on the drum and shaft engageable by longitudinal shifting of the shaft to transmit rotation between the shaft and drum, a driven gear in the housing, means for holding the gear against longitudinal movement, and helical splines on the gear and shaft transmitting rotation from the gear to the shaft and operable to urge the shaft longitudinally to engage said parts.

5. A power take-off unit for a tractor comprising a housing to be secured to the tractor and having a projecting extension, a rotatable drum on the extension, a rotatable and axially shiftable shaft extending through the extension, a drive supported by the housing for rotating the shaft and supporting the shaft for longitudinal movement, clutch parts on the shaft and drum engageable and disengageable by axial shifting of the shaft, and means for shifting the shaft axially comprising a nut, bearing means in the nut supporting the nut on the shaft for rotation with respect thereto and for axial movement therewith, a part stationary with the housing and surrounding the nut, mating threads on the nut and said part in surrounding relation to said bearing means, and manual means for turning the nut whereby the threads cause axial shifting of the shaft and nut.

6. A power take-off unit of the character described comprising a housing, a rotatable drum carried by the housing, a rotatable and longitudinally shiftable drive shaft for driving the drum, clutch parts on the drum and shaft engageable by longitudinal shifting of the shaft to transmit rotation between the shaft and drum, a driven gear in the housing supporting the shaft for longitudinal movement, means for rotatably supporting the gear in the housing and for holding the gear against longitudinal movement, manually operable means for shifting the shaft longitudinally to engage and disengage said parts, and helical spindles on the interior of the gear and on the shaft transmitting rotation between the gear and shaft and operable to assist the manually operable means in shifting the shaft to bring said parts into engagement.

7. A power take-off unit for a tractor comprisnig a housing, means at the front of the housing for securing the same to the tractor, a generally horizontal drum rotatably supported at the rear side of the housing to extend rearwardly therefrom and to have its axis of rotation substantially parallel with the longitudinal axis of the tractor, a drive in the housing including a rotatable and longitudinally shiftable shaft for driving the drum extending rearwardly through the drum to the rear end of the drum, and a clutch at the rear end of the drum for transmitting rotation from the shaft to the drum controlled by longitudinal shifting of the shaft.

8. A power take-off attachment for a tractor comprising a housing to be attached to the tractor and having a rearwardly projecting extension, a drum rotatable on the extension, a gear in the housing having a hub, a bearing secured in the housing receiving the hub to rotatably support the gear, a rotatable and longitudinally shiftable drive shaft extending through the hub and extension and bearing in the hub to be supported thereby, slidably cooperating splines in the hub and on the shaft whereby the shaft is longitudinally shiftable and is rotated by the gear, clutch parts on the shaft and the rear end of the drum engaged and disengaged by shifting of the shaft, means for rotating the gear, and means on the forward end of the shaft for shifting the shaft longitudinally to engage and disengage the clutch parts.

HUGH ALLEN HUTCHINS.